United States Patent [19]
Coggiola

[11] 4,184,641
[45] Jan. 22, 1980

[54] SAFETY DEVICE FOR DOMESTIC APPLIANCES

[75] Inventor: Marcel Coggiola, Le Perreux, France

[73] Assignee: Societe Industrielle et Forestiere des Allumettes, Paris, France

[21] Appl. No.: 888,661

[22] Filed: Mar. 21, 1978

[30] Foreign Application Priority Data

Mar. 23, 1977 [FR] France ............................ 77 08648

[51] Int. Cl.² ............................................. B02C 18/24
[52] U.S. Cl. .................................. 241/37.5; 241/282.1
[58] Field of Search ............. 241/36, 37.5, 92, 199.12, 241/282.1, 282.2

[56] References Cited

U.S. PATENT DOCUMENTS

| | | | |
|---|---|---|---|
| 3,434,518 | 3/1969 | Motis | 241/199.12 |
| 3,493,022 | 2/1970 | Mantelet | 241/199.12 |
| 3,892,365 | 7/1975 | Verdin | 241/92 |
| 4,113,188 | 9/1978 | Belinkoff | 241/282.1 X |

*Primary Examiner*—Howard N. Goldberg
*Attorney, Agent, or Firm*—Brooks Haidt Haffner & Delahunty

[57] ABSTRACT

The invention relates to a motorised food preparation appliance having a covered work bowl and in particular to a safety arrangement whereby a tab on the cover of the work bowl can be moved into contact with the operating member of the on/off switch of the motor of the appliance as the cover is rotated into correct operative position on the work bowl.

11 Claims, 5 Drawing Figures

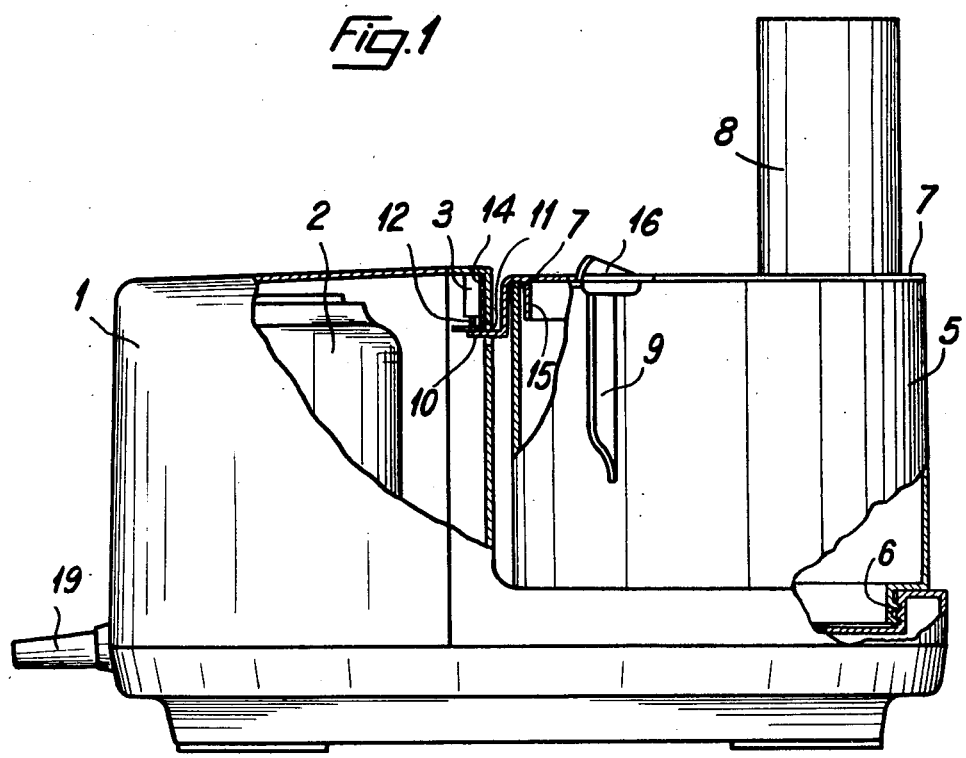
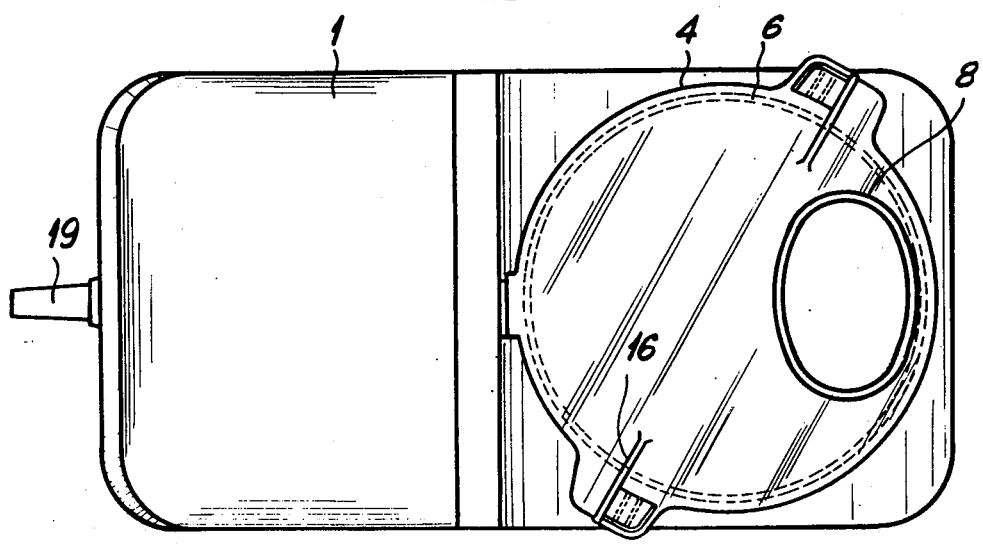

SAFETY DEVICE FOR DOMESTIC APPLIANCES

The present invention relates to a safety device intended particularly but not exclusively for domestic appliances used in the preparation of food, comprising several interchangeable rotary utensils such as blades and chopping or mincing discs.

More specifically, the invention relates to appliances which comprise a motor unit, with a base for a work bowl into which a motorised shaft projects which can hold various utensils. Appliances of this kind are known, in particular from French Pat. No. 71,27039 in the name of Pierre VERDUN.

In appliances which are widely used by non-qualified personnel it is desirable and even essential that there should be means to prevent the appliance being inadvertently switched on, since this may result in serious injury. In the above-mentioned Patent, the appliance can only operate when the cover is put in place on the bowl. For this purpose the peripheral wall of the bowl has a duct which extends over all its height, inside which a sliding push-rod is installed, the lower end of which is designed to act on a control switch for the motor which is attached to the motor housing. For this purpose the removable cover of the bowl has a cam which can act on the upper end of the push-rod when the cover is in place.

Experience has shown that in certain cases, particularly when the appliances are accidentally handled by children, this precaution is not sufficient.

The present invention relates to a safety device which will remedy the disadvantages of the known devices and which only allows the appliance to be operated if, and only if, the cover is properly attached to the bowl.

According to the present invention, the safety device for electrical domestic appliances for food preparation which comprise a motor unit arranged inside the housing, and wherein the said housing has means for securing the bowl, is characterised in that the cover of the bowl can be rotated on the bowl at a specific angle, and has a generally horizontal tab which penetrates into the interior of the motor housing and comes into contact with an operating switch for the motor.

Other characteristics and advantages of the invention will become apparent from the following description of one particular embodiment of the invention, with reference to the Figures.

FIG. 1 is an elevation of an appliance in the operating state.

FIG. 2 is a view from above onto the same appliance.

Figure 3:
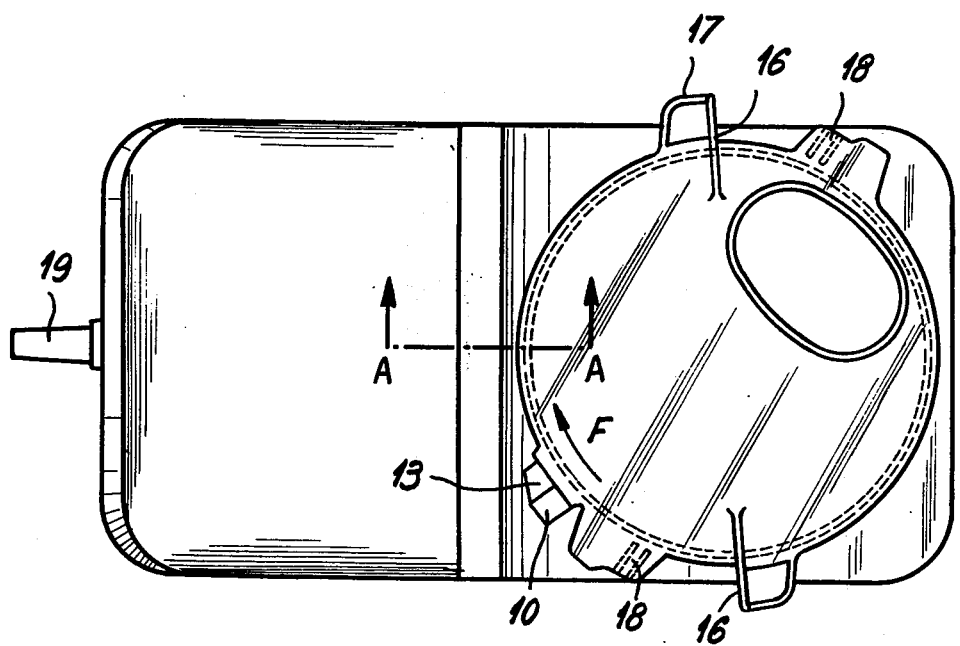
FIG. 3 is a view from above, showing the same appliance, but in the dismantled state.
Figure 4:
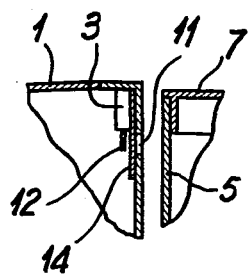
FIG. 4 is a section along line A—A in FIG. 3.
Figure 5:
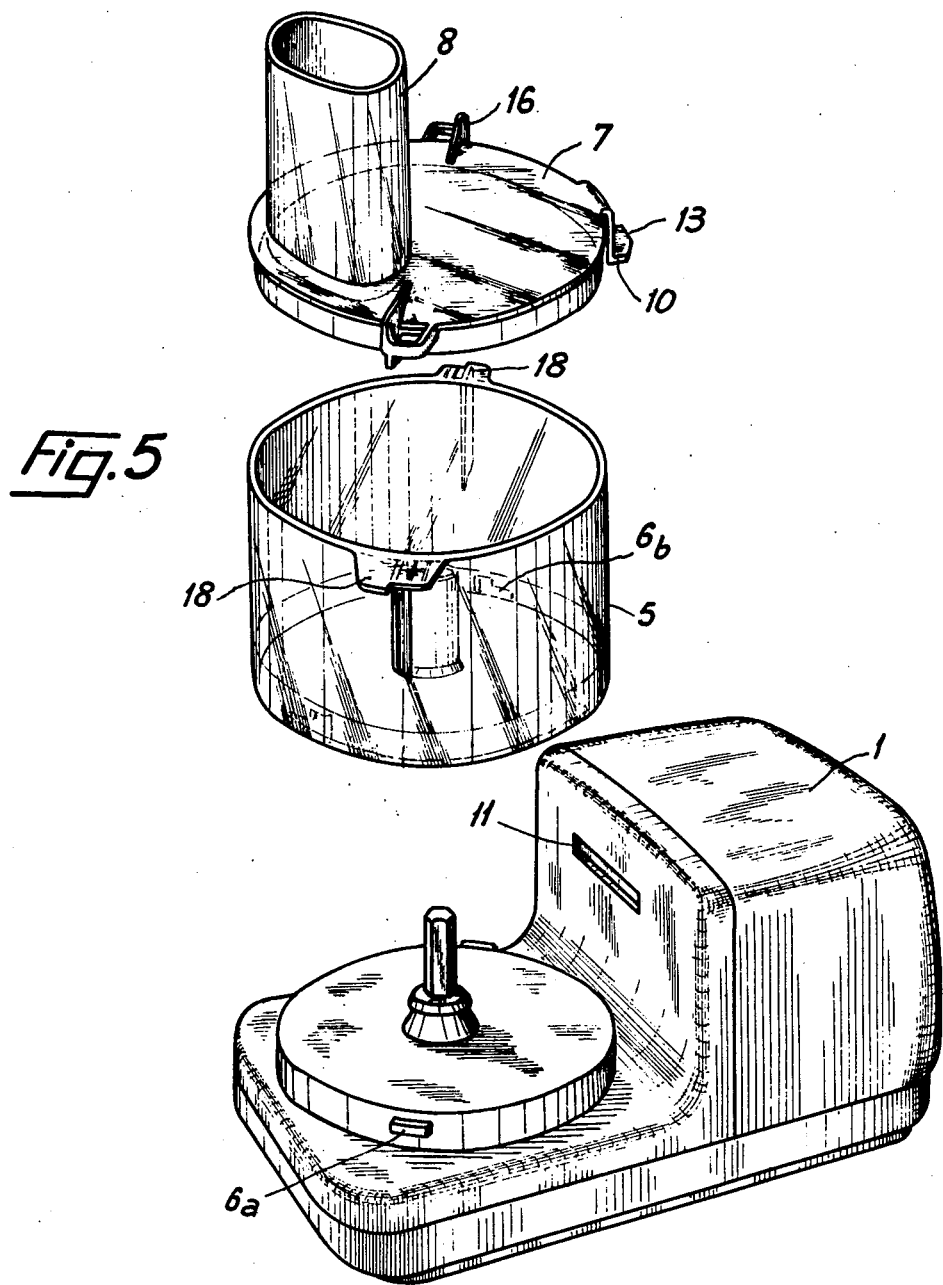
FIG. 5 is an exploded view of the appliance.

In FIG. 1 a housing 1 encloses a motor 2 which is controlled by a switch 3. The housing 1 also comprises a recess 4 for the base of a bowl 5, the bowl 5 being secured on the housing 1 in the operating position by means of a helicoidal ramp or thread 6, or else by a bayonet mounting, as illustrated in FIG. 5. Bowl 5 is broken away at the lower right to show the ramp or thread in section. The bowl 5 is capped by a cover 7 which bears a funnel 8 which prevents any manual contact with the disc when the utensil is a mincing disc rotating in the upper part of the bowl. Advantageously, the bowl 5 bears on its periphery two diametrically opposed lugs 9 which allow the bowl 5 to be conveniently located on the motor housing 1. The cover 7 has a generally horizontal tab 10 which is designed to come in contact with a push-rod 12 of the switch 3, when passed through a slot 11 in the housing 1. Advantageously, the tab 10 comprises a front section 13 which forms an inclined plane and makes it easier to put the tab 10 in contact with the push-rod 12. The switch 3 is preferably arranged above the plane in which the tab 10 moves and a flexible shutter 14 closes off the slot 11 when the tab is not engaged (see FIG. 4) so that the switch is always isolated from the external environment and protected from any projections. As can be seen in FIG. 1, the cover 7 also comprises a skirt 15 designed to penetrate inside the bowl and ensure the leak-tightness of the receptacle, in conjunction with the upper part thereof. The upper surface of the cover 7 also bears two vertical plates 16 designed to facilitate rotation of the cover 7 on the bowl 5. Ribs 18 on handles of the bowl co-act (as seen more clearly in FIG. 3) with substantially horizontal lugs 17 on the cover 7, which lugs are provided with recesses into which the ribs locate to effect a locking of the cover on the bowl. The rotary movement (in the direction of arrow F) which moves the ribs into the recesses in the lugs 17 also effects the introduction of the contact tab 10 through the slot 11 into the interior of motor housing 1, which causes the appliance to start up. It is obvious that the position of the tab is determined by the position of the bowl on the housing and, for this reason, a screw thread is advantageously provided on the lower part of the bowl, allowing the latter to be secured on the said housing in one position only. The supply of electrical power to the motor is provided via a cable 19.

In the embodiment of FIG. 5, bowl 5 is secured on housing 1 by a bayonet mounting, illustrated by one ear 6a and one slot 6b. There are an ear and a slot on substantially opposite sides of housing 1 and bowl 5, respectively, for engagement.

Operation of the appliance is extremely simple:

The bowl is secured in the correct position on the housing, with the motorised shaft projecting into the interior of the said bowl, a utensil is fitted to this shaft and the food substance which is to be processed is put, if appropriate, into the bowl. The cover 7 is then placed on the bowl 5 and rotated on the bowl, which movement simultaneously effects the locking of the cover on the bowl and the starting up of the electric motor by the penetration of the tab 10 into the slot 11 and contact with the push-rod 12. When substances which are to be shredded or minced are involved, these products are introduced into the funnel 8 after the appliance has been started up.

To interrupt operation of the appliance, all that is required is for the cover to be turned in the opposite direction to that indicated by the arrow F (FIG. 3) and the cover, then the bowl, may be removed from the housing at that moment. The operating switch of the appliance is thus well protected from projections and, being enclosed in the housing of the motor unit, it is only accessible with great difficulty for switching on, other than with the means provided by the manufacturer, with the aid of a pencil, for example.

Obviously, modifications can be carried out to the construction form described above, particularly by substituting equivalent technical means, without exceeding the scope of the present invention.

What is claimed is:

1. A food preparation appliance comprising, in combination; a housing, an electric motor within the housing, bowl receiving means on the housing, a work bowl for removable location in the receiving means, an on/off switch in the housing and adjacent to an opening formed therein, said switch being located in an electric supply cord to the motor, and a cover removably locatable over the bowl, characterised in that the cover includes a control tab which, on rotation of the cover on the bowl to secure the cover to the bowl, moves in a substantially horizontal plane and passes through the opening in the housing to hold said switch in its "on" condition.

2. An appliance as claimed in claim 1, in which there is provided a shutter normally closing said opening and displaceable from such a closing position by movement of the tab through the opening as the cover is secured on the bowl.

3. An appliance as claimed in claim 1, in which the means receiving the bowl on the housing and the means securing the cover on the bowl are oriented relative to one another so that the tab only enters the opening in the housing when the bowl is correctly located on the housing and the cover is correctly secured on the bowl.

4. An appliance as claimed in claim 3, in which the tab has a camming surface formed thereon, the camming surface being on the side of the tab which first contacts the switch when the tab enters the opening as the cover is secured on the bowl.

5. In a food preparation appliance having an electric motor in a housing on which a work bowl is removably mounted, the bowl being provided with a cover which includes means for operating an on/off switch for the motor, the provision of a safety device in the form of a control tab which, on rotation of the bowl cover on the bowl, moves in a substantially horizontal plane and is introduced through a slot provided in the housing, and which thereby comes into contact with an actuating element of the on/off switch.

6. A safety device according to claim 5 characterised in that the switch is located inside the housing and above the said slot.

7. A safety device according to claim 6, characterised in that the leading edge of the tab defines a camming surface to facilitate the engagement of said tab with the actuating element of the on/off switch.

8. A safety device according to claim 5, characterised in that a shutter of flexible material normally closes the said slot, the said shutter being pushed away from the slot by the introduction of the tab through the slot.

9. A safety device according to claim 5 characterised in that the bowl is mounted on the housing by means of a screw thread in such a way that the contact tab on the cover cannot penetrate into the slot in the housing unless the bowl is correctly locked on the housing.

10. A safety device according to claim 9, characterised in that the termination of the rotary movement of the bowl cover on the said bowl results (a) in the cover being locked on the bowl by the introduction of locking projections on the bowl into recesses on the cover, and (b) in the starting up of the motor by contact of the contact tab with the actuating element of the on/off switch.

11. A safety device according to claim 5 characterised in that the bowl is fitted on the housing by means of a bayonet mounting in such a way that the contact tab on the cover cannot penetrate into the slot in the housing unless the bowl is correctly locked on the housing.

* * * * *